May 29, 1945.  H. F. FRUTH  2,377,222
BIMETALLIC CLAMP
Filed April 1, 1944
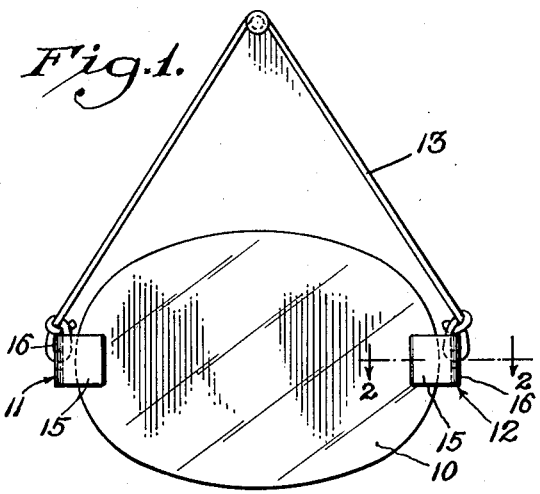
Fig.1.
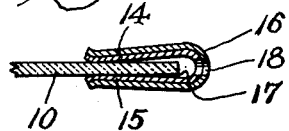
Fig.2.
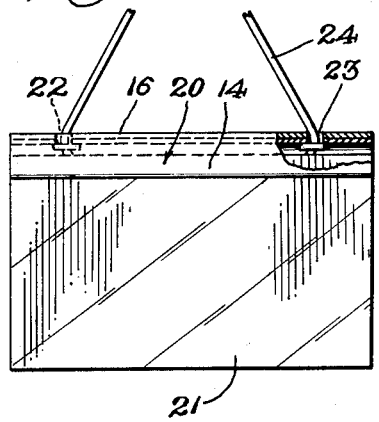
Fig.3.
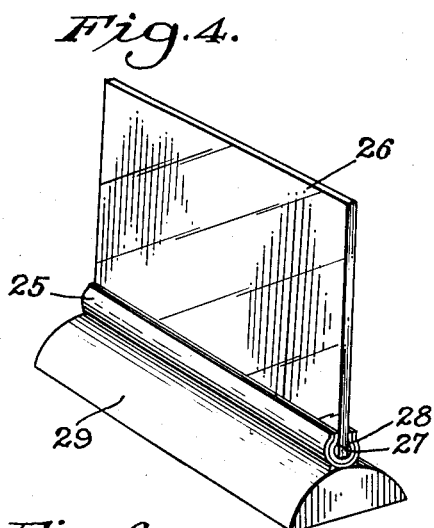
Fig.4.
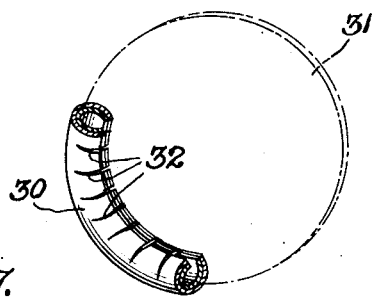
Fig.5.
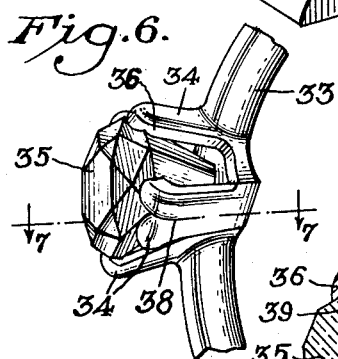
Fig.6.
Fig.7.
Inventor
Hal F. Fruth.
BY
Carlson, Pitzner, Hubbard & Wolfe.
Attorneys.

Patented May 29, 1945

2,377,222

UNITED STATES PATENT OFFICE 2,377,222

BIMETALLIC CLAMP

Hal Frederick Fruth, Skokie, Ill.

Application April 1, 1944, Serial No. 529,045

9 Claims. (Cl. 24—243)

This invention relates to clamps or holders and more particularly to bimetallic clamps which are adapted to be applied to an article or material while heated above or chilled below the ordinary temperatures of use, and to clamp or grip said article or material at normal temperatures as a result of the action of a bimetallic element.

A general object of this invention is to provide a clamp which utilizes the heat responsive flexing properties of bimetallic material for effecting the release and gripping action of the clamp.

Another object of this invention is to provide a clamp which grips firmly under normal conditions of use, but which may be released by chilling or by the application of heat thereto.

Another object of this invention is to provide a clamp particularly adapted to holding securely the edge or opposed surfaces of hard or brittle substances of a nature such that drilling or shaping is impractical or undesirable.

It is also an object of this invention to provide a clamp adapted to relatively permanent clamping service, but adapted to substantial ease of application and removal without permanent injury to the clamp or clamped article.

Another object of the invention is to provide a clamp adapted inherently to grip in transverse directions the surfaces of an article having curved or angularly disposed surfaces engaged by the clamp.

Still another object of this invention is to provide a clamp adapted by fabrication or preadjustment to grip with adequate firmness an article of predetermined size.

Other objects and advantages will become apparent from the following description taken in connection with the accompanying drawing, in which:

Figure 1 is a front elevational view of a preferred embodiment of this invention and shows its adaptation to the support of a mirror, picture or the like.

Fig. 2 is a sectional view of a portion of the structure shown in Fig. 1 with the section taken substantially on a line 2—2 of Fig. 1.

Figs. 3 and 4 are respectively elevational and perspective views of modifications of this invention which also illustrate adaptations to the support of mirrors, pictures, or the like.

Fig. 5 is a perspective view of a modification of this invention which illustrates its adaptation to the gripping or holding of an article having a curved surface.

Fig. 6 is a fragmentary perspective view of a modification of this invention which illustrates its adaptation to the holding of a precious stone in jewelry.

Fig. 7 is a fragmentary sectional view of the structure illustrated in Fig. 6 with the section taken substantially on a line 7—7 of Fig. 6.

While the invention is susceptible of various modifications and alternative constructions, I have shown in the drawing and will herein describe in detail, the preferred embodiment, but it is to be understood that I do not thereby intend to limit the invention to the specific form disclosed, but intend to cover all modifications and alternative constructions falling within the spirit and scope of the invention as expressed in the appended claims.

It is to be understood in connection with the various adaptations of this invention which are illustrated in the drawing, that they are primarily shown for the purpose of illustrating the principles of the invention in various adaptations. Examples of a few of the many adaptations of this invention which are not illustrated in particular in this application are its uses in ophthalmic mountings, the holding of cutting tools such as diamonds, and the holding of jeweled bearings.

In the selection of the metals which comprise the bimetal utilized in the practice of this invention, those metals must necessarily have the proper difference of expansion coefficients to provide the desired flexure characteristics, and must also have characteristics such as hardness and melting point which are suited to a particular use. By way of example, the combination of brass and Invar in a bimetallic element is adaptable to many uses. Brass has a relatively high temperature coefficient of expansion, while Invar is an alloy of nickel and steel and has a very low coefficient of expansion. In addition to this, both of these metals may be plated to provide a desired surface finish for the proposed use. Where the use warrants the inclusion of a precious metal, platinum may be used with another metal such as brass, since platinum has a very low coefficient of expansion. The temperature coefficient of expansion of aluminum and the aluminum alloys is high and consequently such aluminum or aluminum alloys may be substituted in certain uses for brass or similar metals. In each instance the relative disposition of the metals in a clamp or holding element depends upon whether the release of the clamp is more desirably effected by the application of heat, or by chilling. The relative disposition of the metals in the bimetal is also a factor which is influenced by the normal temperature at which the clamp is to be used.

Referring to Figs. 1 and 2, an article 10, which is to be supported and which may be a mirror or picture glass by way of example, has clamps or holders 11 and 12 of the type with which this invention is particularly concerned, secured to diametrically opposite sides and supported by a suitable cord or wire 13. The clamps or holders 11 and 12 are made of bimetal and have opposed side portions 14 and 15 extending from an integral connecting portion 16. The side and connecting portions form a channel 17 in which the supported article is disposed. An opening 18 is provided in the connecting portion 16 to accommodate the cord or wire hanger 13.

The spacing of the opposed gripping surfaces is preferably such that flexure of the bimetallic clamp or holder is required to effect the insertion of the edge of the article 10. This required flexure is accomplished by the heating or chilling of the bimetallic clamp or holder; the requirement of heating or chilling being dependent upon the relative disposition of the metals of the bimetal. If the inner layer of metal has the higher coefficient of expansion, the separation of the opposed side portions 14 and 15 is effected by the heating of the clamp or holder. If the outer metal layer of the bimetal has the higher coefficient of expansion, the separation of the opposed side portions 14 and 15 is accomplished by chilling the clamp or holder. In both instances the spacing of the side portions 14 and 15 is predetermined and selected to provide the desired or necessary clamping force at temperatures within the range of normal use. In the presently disclosed use it is preferable that the side portions 14 and 15 are somewhat more widely separated adjacent the connecting portion 16 than at their extending ends so that the resilience or normal bending of the bimetal is utilized to compensate for variations in clamping force which are effected by temperature variations within the usual range of use. With a clamp shaped as shown in Fig. 2, the area of contact increases as the gripping force produced by the flexure of the bimetal increases. In some instances it is preferable that the area gripped by the clamp or holder is unpolished or slightly roughened.

In the modified form of the invention disclosed in Fig. 3, a clamp or holder 20 extends along the top edge of an article 21 such as a mirror or picture glass, and has a section such as that illustrated in Fig. 2 for gripping and supporting the article. The clamp or holder 20 has side portions 14 and 15 and a connecting portion 16 such as those disclosed in Fig. 2, as well as openings 22 and 23 in the connecting portion which accommodate a supporting cord or wire 24. The construction, spacing, and operation of the parts of the clamp or holder of Fig. 3 are similar to those described in connection with Figs. 1 and 2.

Referring to Fig. 4, a clamp or holder 25 extends along the bottom of a supported article such as a picture glass or mirror 26, and grips opposed surfaces near the bottom edge. In this form the end section of the clamp or holder 25 is substantially C-shaped and grips the supported article 26 between opposed surfaces 27 and 28. The clamp or holder 25 is longitudinally secured to a base 29 as by brazing or welding in a position such that it holds the supported article 26 at a desired angle. The clamp or holder is made of bimetal constructed in a manner similar to that described in connection with Figs. 1, 2, and 3 and adapted to have the supported article installed in a similar manner.

Fig. 5 illustrates a clamp or holder 30 which is particularly adapted to use in conjunction with articles such as 31 which have a curved outer surface. The clamp or holder 30 is made of bimetal and has a section such as that illustrated which is substantially C-shaped or may have a section such as that illustrated in Fig. 2. To facilitate conformation of the clamp or holder 30 to the curved surface of the article 31, the inner portion of that clamp or holder is notched, as at 32, with a plurality of transverse notches. It is a feature of this construction that it not only grips the opposed plane surfaces of the gripped article, but also tends to cling to the outer surface due to the longitudinal bending of the bimetallic clamp. Otherwise, the clamping action of the clamp or holder 30 and the construction and installation thereof are similar to those features of the structures previously described.

Referring to Figs. 6 and 7, an article of jewelry such as a ring 33, has a plurality of projecting gripping fingers 34 which are adapted to grip and hold a precious stone or set such as 35. As best shown in Fig. 7, the projecting fingers 34 are made of bimetal. The inner metal layer 36 of the bimetal desirably extends across to the opposed finger 34, as illustrated at 37, to form a substantially C-shaped bimetallic section. The extending ends of the fingers 34 have central longitudinal slots 38 which improve the gripping action of the fingers against the surface of the set 35. The inner surfaces of the fingers 34 are notched or shaped, as at 39, to conform to the surface of the set which is to be gripped and held thereby.

In all of the various modifications and adaptations of this invention which have been disclosed, the clamp or holder is formed and preadjusted to provide a spacing of the gripping surfaces which necessitates a temperature change to effect the installation or release of the article gripped. The materials of which the bimetallic clamp are made and the spacing of the opposed clamping surfaces, as well as the shape of the opposed clamping portions of the clamp, are chosen to provide the necessary clamping force to hold a given article during a normal range of temperature variations. If, for example, a bimetallic clamp or holder such as that illustrated in Fig. 2 is chosen with a metal having a higher coefficient of expansion on the inner surface, the application of heat thereto effects the separation of the gripping surfaces. Heat may be applied through the use of a flame or hot iron to provide the necessary separation for the insertion of the article which is to be clamped. The spacing of the opposed gripping portions 14 and 15 is normally less than the thickness of the article to be gripped, so that upon cooling, a gripping force or pressure is applied to the gripped article. With the preferred shape which has a wider separation between the opposed gripping surfaces at the end near the connecting portion of the clamp, the area of contact with the gripped article increases as the gripping pressure increases. By proper choice of metals and spacing the gripping force of the clamp is sufficiently maintained during a normal range of temperature variations in use, and the temperature required for release of the clamp is abnormal to that normal range of temperatures.

I claim as my invention:

1. A clamp adapted to grip firmly against transversely displaced surfaces of an article and comprising, in combination, a bimetallic clamping element having opposed gripping portions of bimetal extending from an integral connecting portion, the spacing of said gripping portions and the metals used in the bimetal being preselected to effect firm engagement with said article at temperatures within the usual range encountered, and the relations of the metals of the bimetal being such that the gripping portions separate when subjected to an abnormal temperature to thereby effect release of the firm engagement.

2. A clamp adapted to grip and frictionally engage transversely displaced surfaces of an article having an edge and comprising, in combination, a bimetallic clamping element having substantially a channel type section, said bimetallic clamping element being shaped longitudinally to conform to the edge of said article and being adapted to fit over said edge for gripping engagement with said article at temperatures within a predetermined range, said bimetallic element effecting release of said gripping engagement when subjected to a temperature differing materially from one limit of said predetermined range.

3. A clamp comprising, in combination, a bimetallic clamping element comprehending a channeled section having opposed side portions, and said side portions being transversely notched to provide opposed gripping fingers.

4. A clamp comprising, in combination, a clamping member having a substantially C-shaped section of bimetal with opposed end portions, said end portions being spaced a predetermined distance at a predetermined average normal temperature, and said end portions being adapted to separate due to flexure of the bimetal upon being subjected to a temperature differing from said normal temperature.

5. A clamp comprising, in combination, a clamping member having opposed bimetallic side portions with the metals of said bimetallic side portions so disposed that said side portions flex away from each other as a result of temperature change in one sense, and means joining said side portions.

6. A clamp comprising, in combination, a clamping member having opposed sides and a connecting portion joining said opposed sides, said sides and connecting portion being formed of bimetal disposed to effect flexure of the sides toward and away from each other, and means secured to said connecting portion for supporting said clamp.

7. In a clamp, the combination of a formed bimetallic element having spaced side portions extending from a connecting portion, the characteristics of the bimetal being such that a temperature abnormal to ordinary weather variations is required to effect appreciable change of the spacing of said side portions.

8. In a clamp, the combination of a clamping member having opposed extending side portions and a connecting portion, at least one of said portions being made of bimetal so disposed that a predetermined change of temperature of the bimetallic portion effects flexure thereof in a direction such that the side portions are separated.

9. In a clamp, the combination of a clamping member having opposed gripping portions and a connecting portion, said connecting portion comprehending bimetal disposed to flex in a direction such that the gripping portions are moved toward and away from each other due to temperature changes.

HAL FREDERICK FRUTH.